Sept. 26, 1967 W. P. MORROW 3,344,379

MAGNETICALLY OPERATED ELECTRICAL SWITCH

Filed Sept. 28, 1964 4 Sheets-Sheet 1

INVENTOR,
WARREN P. MORROW

BY Harry M. Saragovitz, Edward J. Kelly, Herbert Berl, & J. D. Edgerton
ATTORNEYS

INVENTOR,
WARREN P. MORROW

BY Harry M. Saragovitz, Edward J. Kelly, Herbert Berl & J. D. Edgerton

ATTORNEYS

INVENTOR,
WARREN P. MORROW

BY Harry M. Saragovitz
Edward J. Kelly, Herbert Berl
& J. D. Edgerton
ATTORNEYS

INVENTOR,
WARREN P. MORROW

BY Harry M. Saragovitz,
Edward J. Kelly, Herbert Berl
& J. D. Edgerton
ATTORNEYS United States Patent Office 3,344,379

Patented Sept. 26, 1967

3,344,379
MAGNETICALLY OPERATED ELECTRICAL SWITCH

Warren P. Morrow, Wheaton, Md., assignor to the United States of America as represented by the Secretary of the Army Filed Sept. 28, 1964, Ser. No. 400,303
4 Claims. (Cl. 335—206)

The invention described herein may be manufactured and used by or for the Government of the United States of America for governmental purposes without the payment to me of any royalty thereon.

This invention relates to electrical switches, and more particularly to a magnetically operated switch having a self-compensating feature for static ambient magnetic fields for use in mine fuzes.

One of the most critical problems confronting designers of mine fuzes is the development of an inexpensive yet highly reliable target sensor. Since mines are usually emplaced in considerable numbers to form a defensive perimeter which is maintained for a considerable length of time, it is necessary that the sensor have a long life once the mine is emplaced and that the sensor be relatively insensitive to nearby explosions caused for example by the detonation of other mines in the field. A number of rather sensitive and effective target sensors have been developed which employ electronic components. Since these sensors use active elements, the requirements of the fuze power supply are severe. It is impracticable to operate the sensor on a continuous duty cycle since the sensor would be so short lived as to be of little or no value. To obviate this problem, a second inactive sensor is often provided to detect the approach of a target and connect the electronic sensor to the fuze power supply. The inactive sensor is usually of the mechanical variety which detects vibration. While this technique solves one problem, it creates others. Vibration sensors are often sensitive to shock caused by explosions. Operation of the vibration sensor can cause a sympathetic explosion or the mine to become a dud. Either possibility renders the mine ineffective. Furthermore, these fuzes now have two sensors, one a sensitive electronic sensor employing active elements and the other a less sensitive mechanical sensor employing no active elements. This results in a rather complex system which is very expensive to build. Cost, of course, is an important consideration when hundreds of thousands of mine fuzes are to be built and stockpiled.

It is therefore an object of the present invention to provide a target sensor for a mine fuze which is sensitive yet relatively nonresponsive to shock caused by an explosion and which employs no active elements thereby having an indefinite life and causing no current drain on the fuze power supply.

It is another object of this invention to provide a magnetically operated electrical switch for use in a mine fuze and which will detect a target having a significant magnetic signature.

It is yet another object of the instant invention to provide an inexpensive magnetically operated switch having a self-compensating feature for ambient magnetic fields.

According to the present invention, the foregoing and other objects are attained by providing a magnetically operated switch having two pivot assemblies, one of which carries a magnet and the other of which carries an electrical contact having weak magnetic properties. The two pivot assemblies are weakly coupled magnetically and rotate together to assume an angular orientation in substantial alignment with a prevailing magnetic field. The pivot assembly carrying the electrical contact is thereafter prevented from rotating. An object having a relatively strong magnetic signature will then operate the switch on approach by causing the magnet to deflect and encounter the electrical contact.

The specific nature of the invention, as well as other objects, aspects, uses and advantages thereof, will clearly appear from the following description and from the accompanying drawings in which:

FIG. 5 is an enlarged partial section of the magnetically operated switch taken along section line 5 in FIG. 1;

Figure 1:
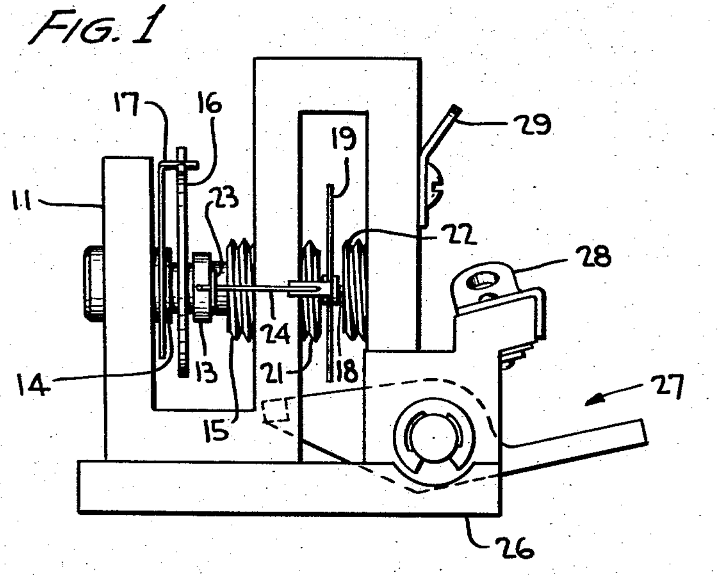
FIG. 1 is a front view of the magnetically operated switch.
Figure 2:
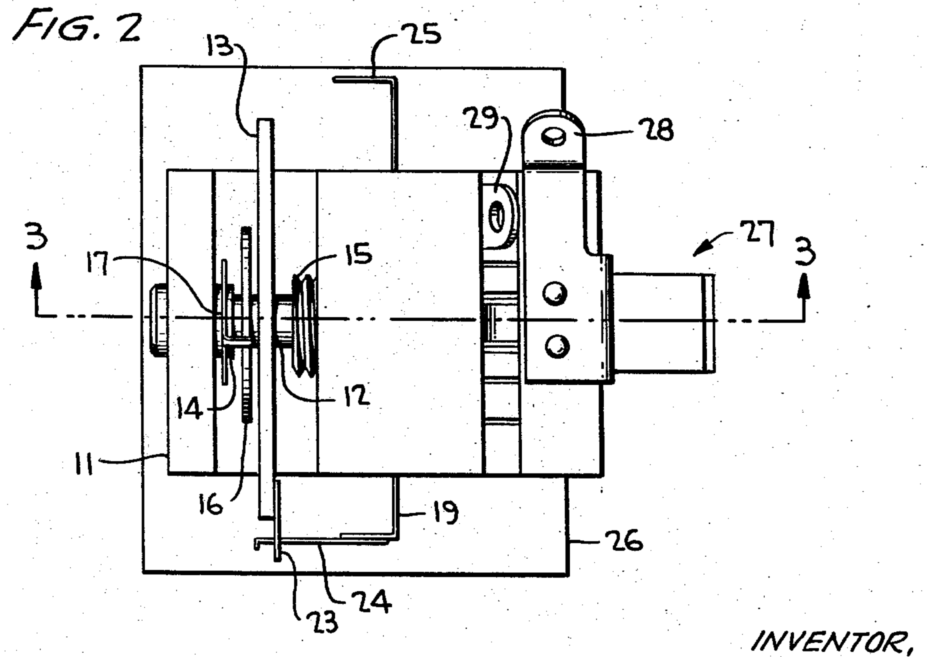
FIG. 2 is a top view of the magnetically operated switch.

Referring now to the drawings wherein like reference numerals designate identical or corresponding parts throughout the several views, and more particularly to FIGS. 1 and 2 wherein an S shaped switch frame 11 of electrically conducting material constitutes the main support member for the switch elements. A first pivot assembly 12 carries a master magnet 13 which is electrically conducting and free to rotate about the pivot axis. The pivot assembly 12 is supported by bearing assembly sections 14 and 15 which are adjustably mounted in an arm and the central section, respectively, of the switch frame 11. A helical hair spring 16 made of electrically conducting material is fixedly attached at one end to the pivot assembly 12. The other end of the helical hair spring 16 is welded to a spring suspension member 17 which is in turn rotatably connected to the bearing assembly section 14. Member 17 is made of electrically conducting material. The suspension member 17 and the helical hair spring 16 constitute a spring suspension for the pivot assembly 12 and master magnet 13. By rotating the suspension member 17 through a small angle, a very small compensating torque can be applied to the pivot assembly 12 to account for any static unbalance in the pivot assembly 12 or the master magnet 13. A second pivot assembly 18 carries a slave contact support member 19 which is made of electrically conducting material and free to rotate about the pivot axis. The pivot assembly is supported in axial alignment with pivot assembly 12 by bearing assembly sections 21 and 22 which are adjustably mounted in the central section and the other arm, respectively, of the switch frame 11. Connected to one end of the master magnet 13 is a master magnet electrical contact 23 which has the shape of an eyelet. A slave electrical contact 24 passes through the master magnet electrical contact 23 and is connected to the corresponding end of the support member 19. Slave electrical contact 24 is in the shape of a wire having a diameter considerably smaller than the eyelet dimensions of electrical contact 23 and is made of a magnetic material which has weak magnetic properties. The pivot assemblies 12 and 18 are therefore weakly coupled by the magnetic interaction of the slave electrical contact 24 with the magnetic flux produced by master magnet 13. This week magnetic coupling causes pivot assembly 18 to rotate with pivot assembly 12. At rest, slave electrical contact 24 is centered within and does not contact master magnet electrical contact 23. The opposite end 25 of support member 19 is extended and formed at a right angle to the main body of member 19 and parallel to slave electrical contact 24 in order to statically balance the contact 24. Attached to switch frame 11 and forming the base of the switch assembly is a brake frame 26 made of electrically insulating material. The brake frame 26 supports a brake assembly 27 which releasably engages support member 19 to prevent pivot assembly 18 from rotating. A first electrical terminal 28 is attached to brake frame 26 and electrically connected to brake assembly 27 and a second electrical terminal 29 is connected to switch frame 11.

Figure 3:
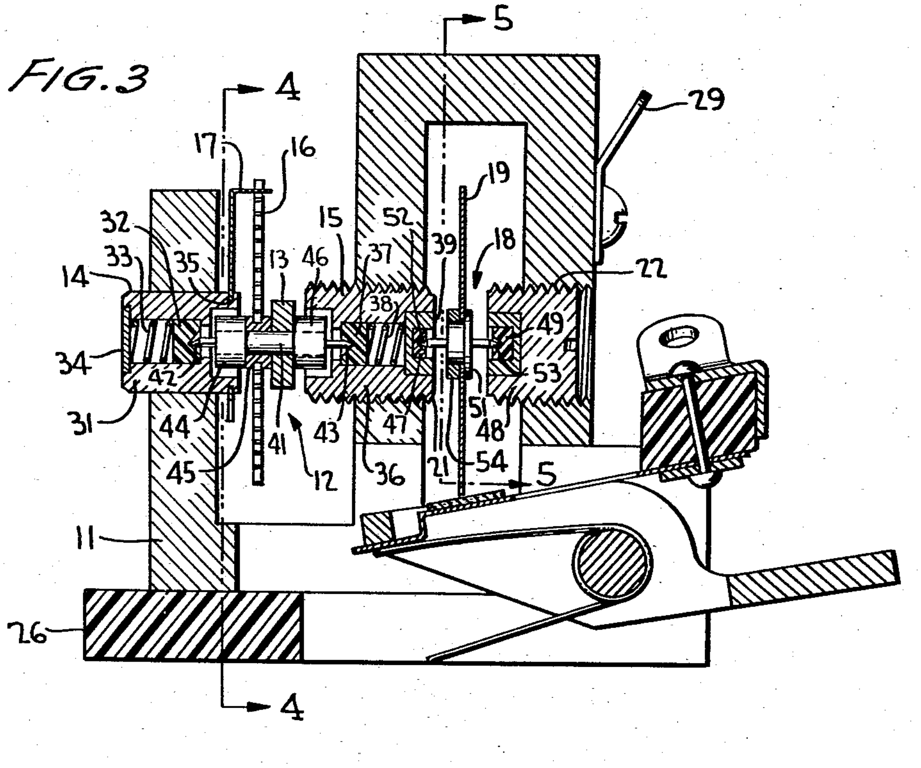
FIG. 3 is an enlarged cross-sectional view taken along section line 3—3 in FIG. 2 showing in detail the pivot and bearing assemblies.

FIG. 3 shows the pivot and bearing assemblies in greater detail. Bearing assembly section 14 is a press fit into one arm of switch frame 11 and comprises a cylindrical bearing housing 31 which holds a jewel V bearing 32. Bearing 32 is spring loaded by coil spring 33 which acts against the base of bearing 32 and plate 34 which seals the end of housing 31. Suspension member 17 is a metal stamping having a slotted hole that engages annular groove 35 in bearing housing 31. Bearing assembly section 15 is a screw fit in the central position of switch frame 11 and comprises a bearing housing 36 which is common to bearing assembly section 21. Bearing housing 36 holds a jewel V bearing 37 which is spring loaded by coil spring 38 acting against the base of bearing 37 and bearing cup 39 which seals bearing housing 36. Pivot assembly 12 comprises a main pivot body 41 having conical pivots 42 and 43 which engage V bearings 32 and 37, respectively. Additionally, pivot body 41 has a collar 44 formed integrally thereon adjacent pivot 42. A collar 45 to which one end of helical hair spring is fixedly attached is rigidly mounted on the pivot body 41 abutting collar 44. The master magnet 13 is firmly attached to pivot body 41 adjoining collar 45. A retaining collar 46 attached to the pivot body 41 adjacent to pivot 43 and abutting master magnet 13 completes the pivot assembly 12. Bearing assembly section 21, also a screw fit in the central portion of switch frame 11, comprises the common bearing housing 36 and the bearing cup 39. The bearing cup 39 holds a jewel V bearing 47. Bearing assembly 22 is a screw fit in the other arm of the switch frame 11 and comprises a solid bearing housing 48 relieved to form a bearing cup. The bearing cup in housing 48 holds a jewel V bearing 49. Pivot assembly 18 comprises a pivot body 51 having conical pivots 52 and 53 which engage V bearings 47 and 49, respectively. Pivot body 51 forms a male collar over a portion of which female collar 54 fits. Slave electrical contact support member 19 is rigidly held to the pivot assembly 18 between the flange of the male collar of pivot body 51 and female collar 54. The two bearing assemblies may be locked in place once an adjustment has been made by screwing set screws, not shown, against the bearing housings 31, 36, and 48.

Figure 4:
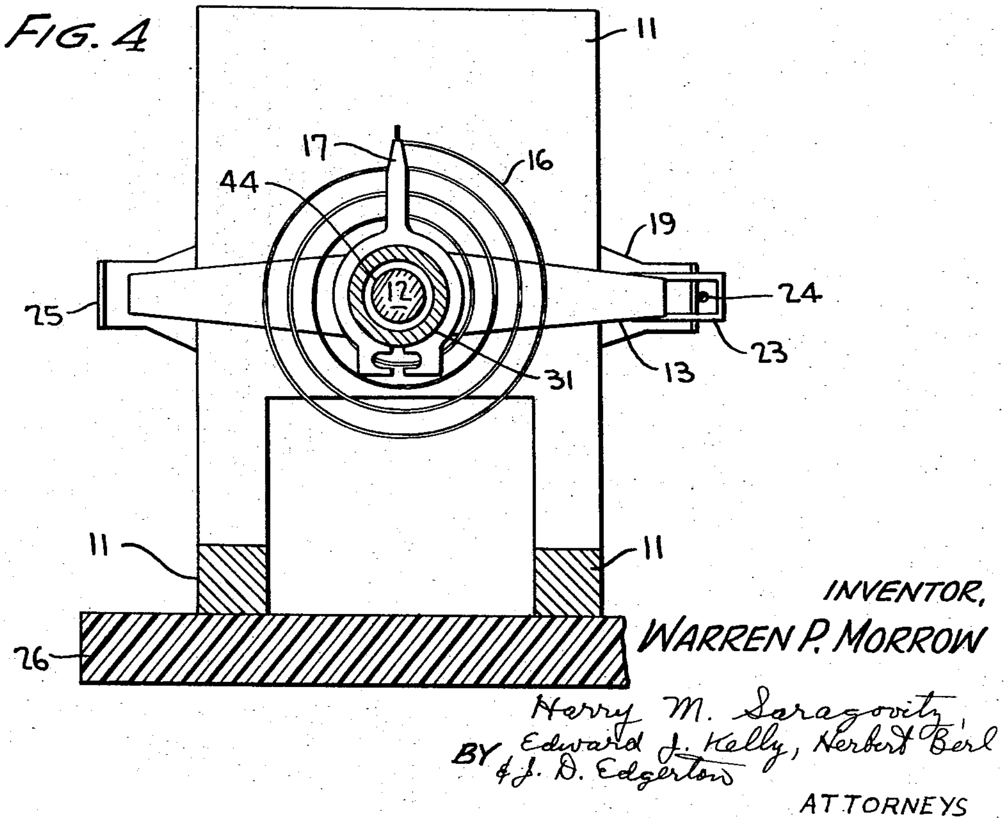
FIG. 4 is an enlarged partial section of the magnetically operated switch taken along section line 4 in FIG. 1.

FIG. 4 is a partial section view of the switch assembly with the brake assembly detached showing a side view of the major components related to the first pivot assembly 12. The slotted hole structure of the suspension member 17 and its engagement about the periphery of bearing housing 31 is particularly evident in this figure. Here, also, the centered relationship of slave electrical contact 24 with respect to the master magnet eelctrical contact 23 is clearly shown.

FIG. 5 is a partial section view of the switch assembly again with the brake assembly detached showing a side view of the major components related to the second pivot assembly 18. The holes 55 and 56 in the slave electrical contact support member 19 serve to lighten the total structure supported by the second bearing assembly. The brake assembly 27, shown in FIGS. 1 and 2, acts to engage the lower arcuate edge 57 of support member 19 to prevent the rotation of pivot assembly 18.

Figure 6:
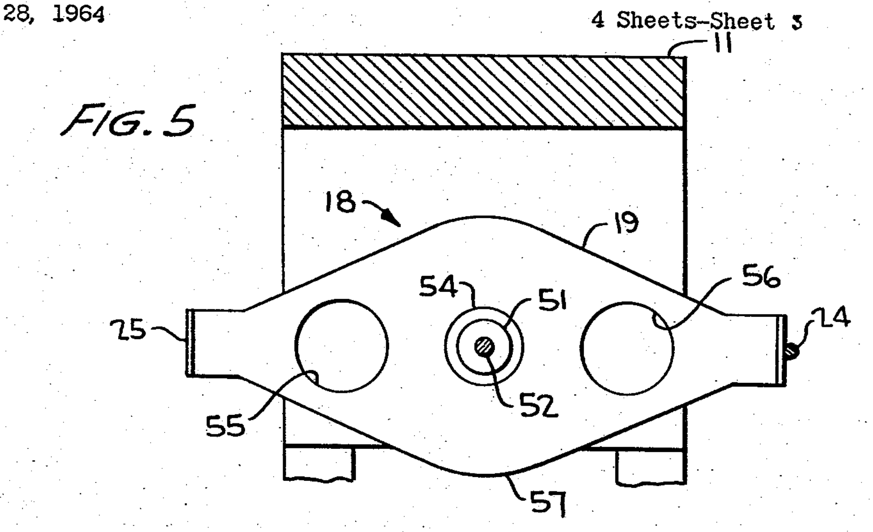
FIG. 6 is a top view of brake assembly detached from the rest of the switch assembly
Figure 7:
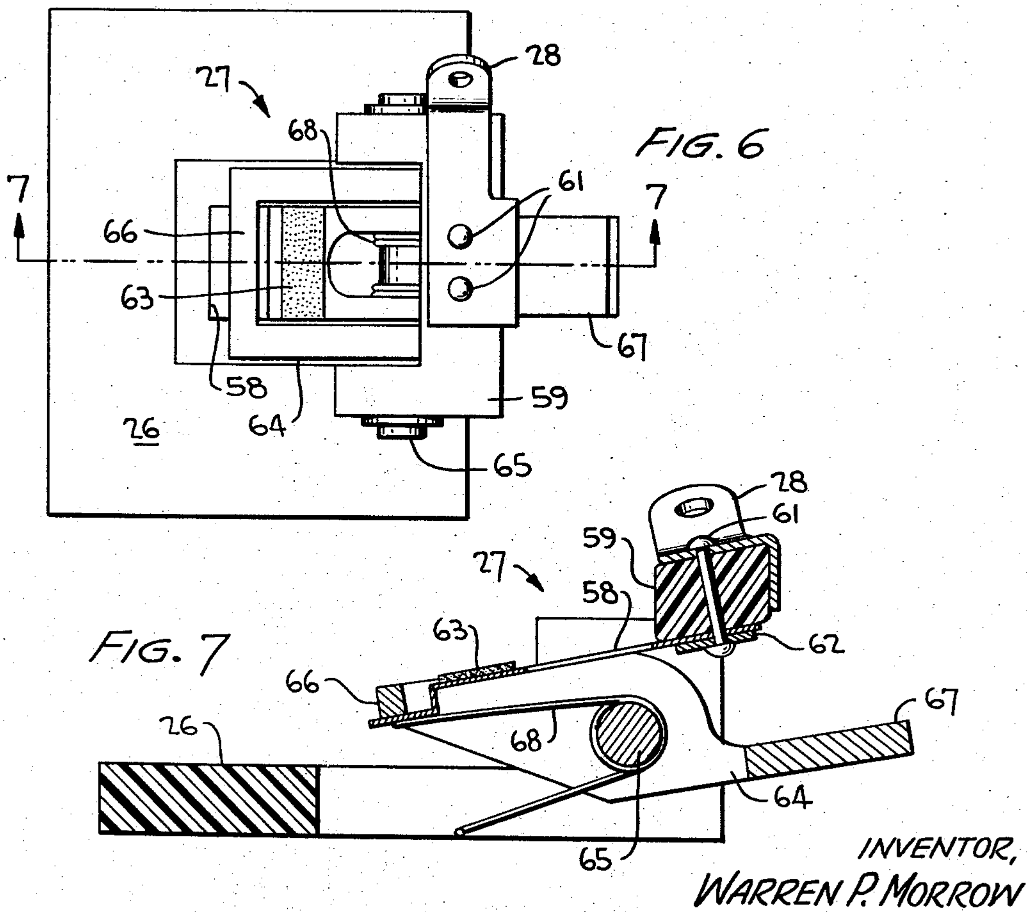
FIG. 7 is a cross-sectional view of the brake assembly taken along section line 7—7 in FIG. 6.
Figure 8:
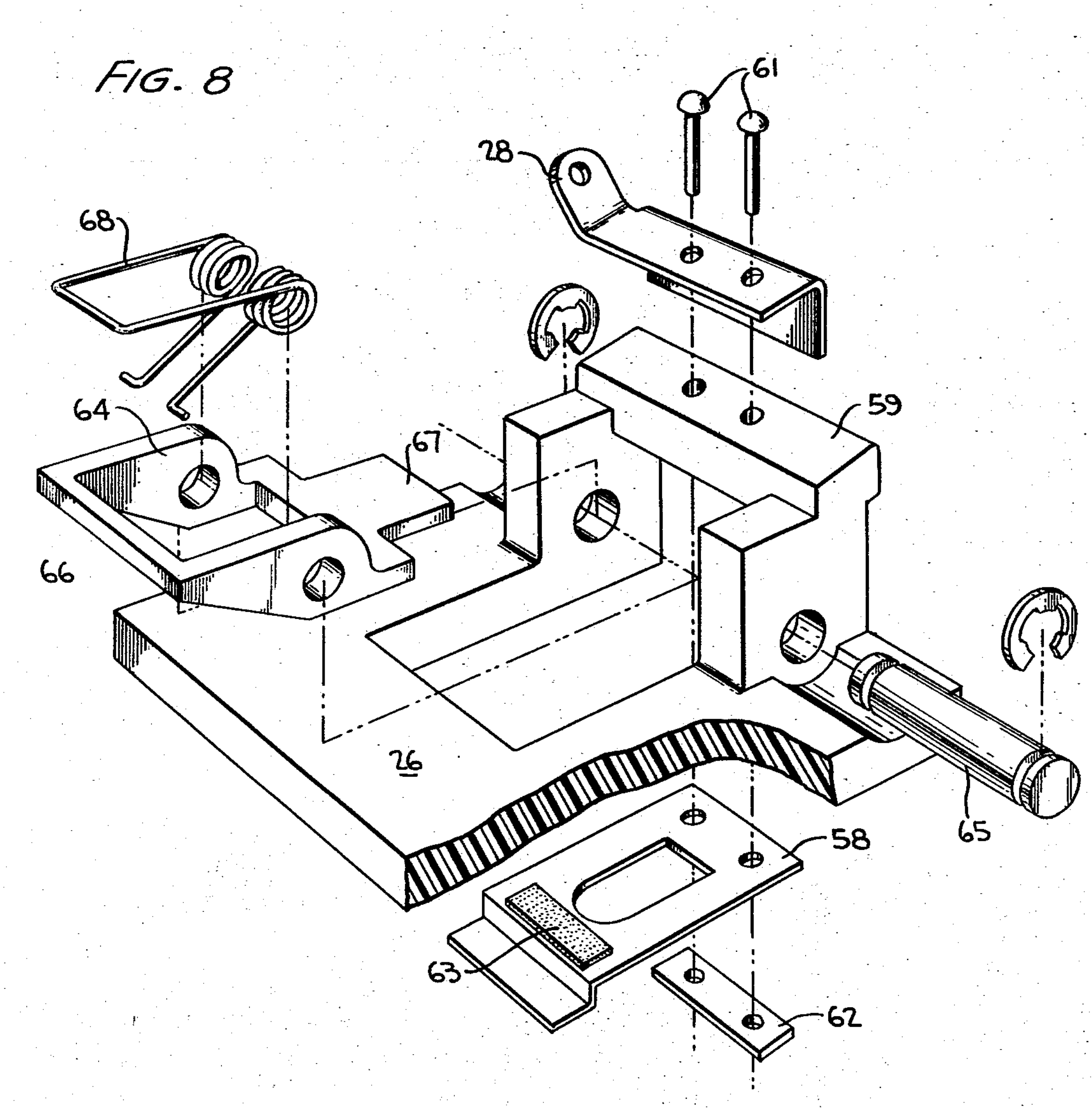
FIG. 8 is an exploded view of the brake shoe and brake shoe yoke assembly.

Referring now to FIGS. 6, 7, and 8 which show in greater detail the structure of brake frame 26 and the brake assembly 27 there is shown a brake shoe 58 made of spring-like, electrically conducting material and attached at one end to cross-member 59 which forms a part of the brake frame 26. Brake shoe 58 is attached to cross-member 59 by rivets 61 and a retaining plate 62. The rivets 61 pass all the way through the cross-member 59 and secure electrical terminal 28 to the other side of cross-member 59 and thereby provide electrical continuity between terminal 28 and brake shoe 58. The brake shoe 58 is provided with an electrically conducting vinyl brake lining 63 which constitutes the surface that engages the arcuate edge 57 of slave contact support member 19, shown in FIG. 5. A brake shoe yoke 64, pivoted on a shaft 65 which is supported by the brake frame 26, has a cross-member 66 which acts on the free end of the brake shoe 58 to depress it and disengage it from the support member 19. The brake shoe yoke 64 is operated by lever arm 67 which is diametrically opposed to cross-member 66. A biasing spring 68 is coiled around shaft 65 and extends to urge brake shoe 58 into engagement with slave electrical contact support member, not shown, in opposition to the brake shoe yoke 64.

In operation, lever arm 67 of brake shoe yoke 64 is held up depressing brake shoe 58 thereby permitting pivot assembly 18 to rotate freely. When a mine using the switch as a target sensor is emplaced, master magnet 13 rotates to assume an angular orientation in substantial alignment with the prevailing local ambient field. The slave electrical contact 24 follows the master magnet 13 and assumes a position in the center of the master magnet contact 23 when the master magnet 13 comes to rest. The fuze is armed by releasing brake lever arm 67 and allowing bias spring 68 to urge brake shoe 58 into engagement with slave electrical contact support member 19 thereby preventing pivot assembly 18 from rotating. An object having a relatively strong magnetic signature will then operate the switch by causing the master magnet 13 to deflect enough to make master magnet electrical contact 23 to contact slave electrical contact 24. The contact of electrical contacts 23 and 24 makes an electrical circuit defined by electrical terminal 28 through rivets 61 to brake shoe 58 through the electrically conducting brake lining 63 to support member 19 through contacts 24 and 23 to master magnet 13 and there through pivot body 41, collar 45, helical hair spring 16, and suspension member 17 to switch frame 11 and thence to electrical terminal 29. It is to be noted that brake shoe 58 and slave electrical support member 19 constitute the contacts of a safety and arming switch since an electrical discontinuity is created when brake lever arm 67 is raised, depressing brake shoe 58. Once armed, the switch is substantially insensitive to shock from nearby explosions since the brake assembly 27 acts in an upward direction of the shock.

It will be apparent that the embodiment shown is only exemplary and that various modifications can be made in construction and arrangement within the scope of the invention as defined in the appended claims.

I claim as my invention:

1. A magnetically operated electrical switch comprising:

(a) a switch frame, (b) a first pivot assembly, (c) a first bearing assembly mounted in said switch frame and supporting said first pivot assembly and permitting free rotation of said first pivot assembly about its axis, (d) a master magnet fixedly mounted on said first pivot assembly and having its magnetic axis perpendicular to the pivot axis, (e) a hair spring having two ends, the first of which is fixedly attached to said first pivot assembly and the second of which is adjustably attached to said switch frame for providing a mechanical bias to said first pivot assembly in order to compensate for any static unbalance in said first pivot assembly and said master magnet, (f) a master magnet electrical contact fixedly attached to said master magnet at a point remote from the pivot axis and near a magnetic pole of said master magnet, (g) a second pivot assembly, (h) a second bearing assembly mounted in said switch frame and supporting said second pivot assembly in axial alignment with said first pivot assembly and permitting free rotation of said second pivot assembly about its axis, (i) a slave electrical contact made of a magnetic material having weak magnetic properties, (j) a slave electrical contact support member fixedly mounted on said second pivot assembly perpendicular to the pivot axis and supporting said slave electrical contact in the arcuate path of said master magnet electrical contact, and (k) brake means operable to prohibit the rotation of said second pivot assembly, whereby said first and second pivot assemblies are weakly coupled by the magnetic interaction of said slave electrical contact with the magnetic flux produced by said master magnet, the weak magnetic coupling of said first and second pivot assemblies causing said second pivot assembly to rotate with said first pivot assembly to assume an angular orientation in substantial alignment with a prevailing ambient magnetic field, said second pivot assembly thereafter being prohibited from rotating by said brake means thereby permitting an object having a relatively strong magnetic signature to operate the switch by deflecting said master magnet.

2. A magnetically operated electrical switch as defined in claim 1 wherein said brake means comprises:

(a) a brake frame rigidly mounted on switch frame, (b) a brake shoe mounted on said brake frame and movable in an upward direction to engage said slave electrical contact support member, (c) means for biasing said brake shoe in an upward direction into engagement with said slave electrical contact support member, and (d) means acting on said brake shoe against said means for biasing for releasably depressing said brake shoe to permit free rotation of said second pivot assembly.

3. A magnetically operated electrical switch as defined in claim 2 wherein said switch frame, said hair spring, said master magnet, said slave electrical contact support member, and said brake shoe are electrically conducting, and said brake frame is electrically insulated from said switch frame, further comprising:

(a) a first electrical terminal electrically connected to said brake shoe, and (b) a second electrical terminal electrically connected to said switch frame, whereby said brake shoe and said slave electrical contact support member constitute the contacts of a safety and arming switch which when engaged permit the making of an electrical circuit defined by said first electrical terminal, said brake shoe, said slave electrical contact support member, said slave electrical contact, said master magnet electrical contact, said master magnet, said hair spring, said switch frame, and said second electrical terminal in that order, the electrical circuit being made by the rotation of said master magnet relative to said slave contact support member in response to a disturbance in the ambient magnetic field thereby causing said master magnet electrical contact to engage said slave electrical contact.

4. A magnetically operated switch comprising:

(a) a rotatable magnet having its magnetic axis perpendicular to its rotation axis, (b) a first eyelet-shaped electrical contact fixedly attached to said magnet at a point remote from its rotation axis and near a magnetic pole of said magnet, (c) a rotatable support member having the same rotation axis as said rotatable magnet, (d) a second electrical contact means of magnetic material for causing said rotatable support member to rotate with said rotatable magnet to assume an angular orientation in substantial alignment with the ambient magnetic field, said second electrical contact being mounted on an extremity of said rotatable support member and placed within the circumference of said first eyelet-shaped electrical contact establishing a weak magnetic interaction between said second electrical contact and the magnetic flux produced by said rotatable magnet, and (e) a brake means for prohibiting said rotatable support member from rotating after said rotatable magnet and said rotatable support member have assumed an angular orientation in substantial alignment with the ambient magnetic field thereby permitting an object having a relatively strong magnetic signature to cause said first and second electrical contacts to make contact by deflecting said rotatable magnet.

References Cited

UNITED STATES PATENTS

| | | | |
|---|---|---|---|
| 1,376,967 | 5/1921 | Nichols | 102—18 |
| 1,388,658 | 8/1921 | Marshall | 102—18 |
| 2,935,943 | 5/1960 | Stimler | 102—18 |

BERNARD A. GILHEANY, *Primary Examiner.*

CHESTER L. JUSTUS, *Examiner.*

G. M. FISHER, R. N. ENVALL, Jr.,
*Assistant Examiners.*